United States Patent [19]

Matsumoto et al.

[11] Patent Number: 4,984,003
[45] Date of Patent: Jan. 8, 1991

[54] DEVICE FOR OPENING AND CLOSING SHUTTER BLADE WITHOUT BOUNCE

[75] Inventors: Jun-ichi Matsumoto, Warabi; Toyonori Sasaki, Tokyo; Kiyoshi Touma, Tokorozawa, all of Japan

[73] Assignee: Copal Company Limited, Tokyo, Japan

[21] Appl. No.: 382,187

[22] Filed: Jul. 20, 1989

[30] Foreign Application Priority Data

Jul. 22, 1988 [JP] Japan ................................. 63-97108
Jul. 22, 1988 [JP] Japan ................................. 63-97107
Jul. 26, 1988 [JP] Japan ................................. 63-98777

[51] Int. Cl.$^5$ .............................................. G03B 9/08
[52] U.S. Cl. ................... 354/235.1; 354/456; 354/440
[58] Field of Search ............. 354/234.1, 235.1, 456, 354/464, 412, 435, 436, 437, 439, 440, 266

[56] References Cited

U.S. PATENT DOCUMENTS 4,479,704 10/1984 Masunaga .......................... 354/413
4,527,877 7/1985 Kurosu et al. ................... 354/234.1

*Primary Examiner*—L. T. Hix
*Assistant Examiner*—Cassandra C. Spyrou
*Attorney, Agent, or Firm*—Oblon, Spivak, McClelland, Maier & Neustadt

[57] ABSTRACT

The device for opening/closing the shutter blade(s) of a photographic camera comprises an electromagnetic actuator coupled with the shutter blade(s) and adapted to open or close the same upon supply of a current from an electrode source through a driver and/or a control circuit to the actuator in one direction or in the opposite direction. The electric source is a constant current circuit and a current regulating circuit is interposed between the constant current circuit and the driver thereby permitting the shutter opening speed to be adjusted by regulating the current regulating circuit. Alternatively, the electric source is a constant voltage circuit and a resistor is connected in series between the driver and the actuator thereby permitting the shutter opening speed to be adjusted by regulating the resistance of the resistor. The control circuit may be so constructed that the shutter opening current is interrupted a predetermined time prior to the fully opened position of the shutter blade(s) and the shutter closing current is supplied for a predetermined time period after interruption thereof to avoid the bounce of the shutter blade(s). One of a pair of symetrically shaped and actuated shutter blades is stopped by stopper means at the fully opened position so as to be bounced therefrom and the bouncing movement is cancelled by the inertia of the opening movement of the other shutter blades at the fully opened position by virtue of the coupling of the pair of shutter blades commonly with the actuator.

7 Claims, 5 Drawing Sheets

SHUTTER BLADE OPENING CURVE

DEVICE FOR OPENING AND CLOSING SHUTTER BLADE WITHOUT BOUNCE

BACKGROUND OF THE INVENTION

1. Field of the Invention

The present invention relates to a device for opening and closing shutter blade(s) of a shutter in a photographic camera.

2. Description of the Prior Art

It has been proposed in a multi-focus camera or a zoom lens camera to incorporate therein an electromagnetic actuator of the rotary magnet type consisting of a rotatable permanent magnet rotor operatively coupled with the shutter blade(s) and a stationary coil surrounding the rotor and electromagnetically cooperating therewith. The rotor is adapted to be rotated in one direction when a current is applied to the stationary coil in one direction, while the rotor is rotated in the opposite direction when a current is applied to the stationary coil in the opposite direction, so that the shutter blade(s) can be opened and closed depending upon the direction of the current applied to the stationary coil thereby permitting the exposure of the camera to be achieved.

In such a shutter of the prior art, however, it suffers from various problems in actuating the shutter blade(s).

(1) In case the opening of the shutter blade(s) is effected by mechanical means such as a spring, the performance or the opening speed of the shutter blade(s) can be varied by merely adjusting the mechanical property of the mechanical means, the force of the spring, for example, so as to achieve the desired performance of the individual shutter.

However, in the case of a shutter in which an electromagnetic actuator such as a stepping motor is used in opening the shutter blade(s), a complicated circuit is required for adjusting the opening speed of the shutter blade(s) so as to vary the duty factor of the driving pulses of the stepping motor used as the actuator, thereby rendering the shutter to be complicated in construction and the cost of the shutter to be expensive. In case a D.C. motor is used as the power sourse, an encoder or a sensor is required for effecting the feedback operation which renders also the device to be complicated and expensive.

(2) In an electromagnetic actuator, since the torque for rotating the actuator is generated by supplying the current thereto, the current must be applied to the actuator at all times during the actuation of the shutter blade(s) from the start of opening the shutter blade(s) and maintaining the same at the opened position until the shutter closing current is supplied to the actuator so as to close the shutter blade(s) after the exposure. Therefore, the shutter blade(s) tend to seriously bounce when the same strike against stopper means at the end of the opening operation, because the shutter opening current countinues to be supplied to the actuator. Therefore, the exact exposure can not be expected.

(3) In a camera incorporating therein an electromagnetic actuator described above usually includes a spring urging the shutter blade(s) toward the closed position so that the shutter blade(s) can be held closed stably without applying the shutter closing current to the actuator. Alternatively, a magnetic body such as an iron pin is provided at an appropriate position adjacent to the permanent magnet rotor so that it cooperates with the magnetic flux of the rotor so as to urge the rotor in the shutter closing position thereby maintaining the shutter blade(s) stably in the closed position.

However, in a shutter adapted to be incorporated in a single lens reflex camera of the lens shutter type, the shutter must be held opened so as to be able to introduce the light from the object to be photographed through the opened shutter and to view the object by preventing the light from the object from being incident to the photosensitive material by actuating a light intercepting member or a reflexing plate before the exposure. After the range finding operation, the shutter is once closed while the light intercepting member is moved out of the optical axis toward the photosensitive material and then the shutter blade(s) are opened and closed for the exposure.

In such a shutter, the shutter blade(s) must be stably held at the fully opened position by means such as a spring when the electric source is intercepted. Therefore, the shutter closing speed is necessarily lowered making it imposible to effect an exposure of very short shutter time, because the shutter blade(s) must be closed by the shutter closing current against the action of the spring.

SUMMARY OF THE INVENTION

The primary object of the present invention is to overcome the various deficiencies in the operation of the shutter blade(s) in the shutter of the prior art incorporating the electromagnetic actuator.

Other object is to provide a novel and useful device for opening and closing shutter blade(s) of a shutter in a camera incorporating an electromagnetic actuator, which makes it possible to effectively adjust the shutter opening speed without requiring complicated circuit or encoders for feedback operation.

Another object is to provide a novel and useful device for opening and closing shutter blade(s) of a shutter in a camera incorporating an electromagnetic actuator, which makes it possible to effectively prevent the bounce of the shutter blade(s) at the fully opened position so as to achieve exact exposure.

A further object is to provide a novel and useful device for opening and closing shutter blade(s) of a shutter in a camera, particularly, in a single lens reflex camera of the lens shutter type, incorporating an electromagnetic actuator, which makes it possible to achieve an exposure of a short shutter time.

In accordance with the primary feature of the present invention, there is provided a device for opening and closing shutter blade(s) of a shutter in a camera having an electromagnetic actuator of the rotary magnet type consisting of a rotatable permanent magnet rotor operatively coupled with the shutter blade(s) and a stationary coil surrounding the rotor and electromagnetically cooperating therewith, the rotor being adapted to be rotated in one direction when a current is applied in one direction to the stationary coil from an electric source through a driver, while the rotor is rotated in the opposite direction when a current is applied to the stationary coil in the opposite direction, thereby permitting the shutter blade(s) to be opened and closed depending upon the direction of the current applied to the stationary coil for achieving the exposure of the camera, the device being characterized in that the electric source is a constant current circuit and a current regulating circuit is interposed between the constant current circuit and the driver, whereby the current to be applied to the stationary coil is adjusted correspondingly to the magnetic intensity of the permanent magnet rotor by regulating the current regulating circuit so that the required opened speed of the shutter blade(s) can be obtained.

Therefore, an exact exposure can be achieved by adjusting the moving speed of the shutter blade(s).

In the above device, the current regulating circuit may be replaced by a resistor connected in parallel between the stationary coil and the driver, while the constant current circuit is replaced by a constant voltage circuit. Thus, by appropriately regulating the resistance of the resistor, the voltage applied to the stationary coil is adjusted correspondingly to the magnetic intensity of the permanent magnet rotor, so that the required opening speed of the shutter blade(s) can be obtained.

In accordance with the second feature of the present invention, there is provided a device for opening and closing shutter blade(s) of a shutter in a camera having an electromagnetic actuator of the type described above, which is characterized in that a control circuit is provided in the circuit between the electric source and the actuator and the control circuit is so constructed that it supplies to the stationary coil the shutter opening current during the time period from the trigger point at which the opening of the shutter blade(s) from the closed position is to be commenced until the time point a predetermined time prior to the fully opened position of the shutter blade(s) abutting against stopper means and, thereafter, it supplies to the stationary coil the shutter closing current for a predetermined time period thereby braking the opening movement of the shutter blade(s) so that the impact of the shutter blade(s) against the stopper means at the fully opened position of the shutter blade(s) is reduced to avoid the bounce thereof.

Therefore, an exact exposure can be achieved by improving the movement of the shutter blade(s).

The control circuit may also be so constructed that it supplies to the stationary coil a shutter opening current of a reduced value after interruption of the shutter closing current so as to insure that the shutter blade(s) are held in fully opened position until a shutter closing current is again applied to terminate the exposure.

In accordance with a further feature of the present invention, a pair of symmetrically configured and symmetrically actuatable shutter blades are provided which are commonly coupled to the actuator, and stopper means is provided with respect to one of the pair of shutter blades for abutting against this shutter blade at the fully opened position while the other blade is left free to move in the opening direction. When the shutter blades are opened by applying to the stationary coil of the actuator a shutter opening current and when they come to the positions shortly before the fully opened positions, the shutter opening current is interrupted so as to leave the shutter blades freely move by their inertia. Thus, when the shutter blades reach the fully opened positions, one of the shutter blades is bounced by the stopper means while the other is left free to be opened. Therefore, the bouncing movement of the one shutter blade is canceled by the inertia of the opening movement of the other shutter blade by virtue of the fact that both the shutter blades are commonly coupled with the actuator, thereby preventing the bounce of the shutter blades from occurring and the shutter blades are held at the fully opened position until a shutter closing current is applied to terminate the exposure, thereby insuring the proper movement of the shutter the blades.

In accordance with a still further feature of the present invention, there is provided a device for opening and closing shutter blade(s) of a shutter in a camera, particularly in a single lens reflex camera of the lens shutter type, for example, having means for biasing the shutter blade(s) toward the opened position for stably maintaining the same thereat as well as an electromagnetic actuator of the type described above, which is characterized by a control circuit provided between the stationary coil of the actuator and the electric source, the control circuit being so constructed that it supplies a current for closing the shutter blade(s) to the stationary coil which is greater than the current for opening the shutter blade(s), thereby permitting the shutter blade(s) to be closed at a higher speed against the action of the biasing means so that a shorter exposure time can be obtained.

Thus, the movement of the shutter blade(s) is improved according to the present invention even in a single lens reflex camera of the lens shutter type.

DETAILED DESCRIPTION OF THE PREFERRED EMBODIMENTS

Figure 1:
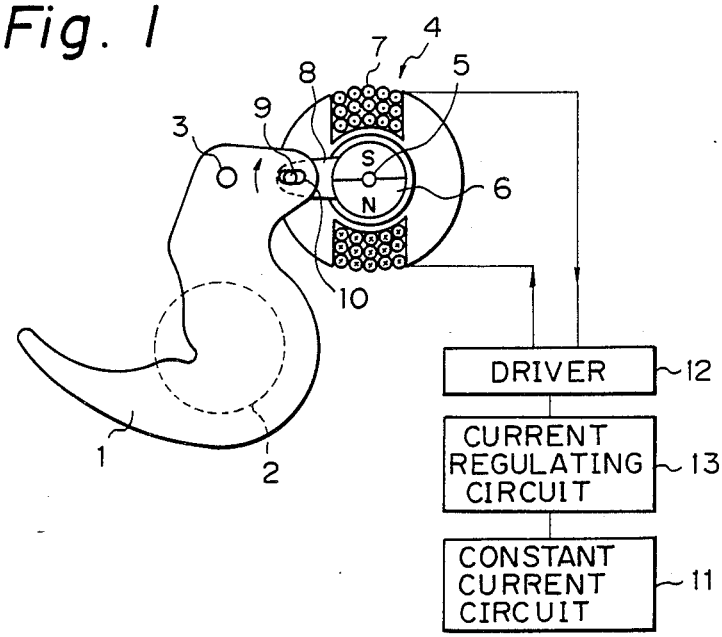
FIG. 1 is a schematic diagram showing the first embodiment of the device for opening and closing shutter blade(s) of a shutter constructed in accordance with the present invention.

With reference to FIG. 1 showing the first embodiment of the device for opening and closing shutter blade(s) of a shutter in a camera of the present invention, a shutter blade 1 in the teardrop shape is swingably supported by a pivot pin 3 secured to a base plate of the shutter (not shown) so that the shutter blade 1 can be moved from a position at which it closes a shutter aperture 2 to a position at which the aperture 2 is opened to allow the scene light to pass therethrough and vice versa.

The shutter blade 1 is coupled with an electromagnetic actuator 4 of the rotary magnet type so that the shutter blade 1 is driven between the open position and the closed position by the actuation of the actuator 4.

The actuator 4 comprises a permanent magnet rotor 6 rotatably supported by a shaft 5 and having N-pole and S-pole diametrically oriented therein as shown in FIG. 1 and a stationary coil 7 surrounding the rotor 6 and adapted to generate a magnetic field in the direction substatially perpendicular to the direction of orientation of the N-pole and the S-pole when a current is applied to the coil 7.

Thus, when a current is applied to the coil 7 in the direction of the arrow shown in FIG. 1, for example, the rotor 6 is rotated in the clockwise direction by the magnetic flux generated by the coil 7 thus energized, but, when a current of the opposite direction is applied to the coil 7, the rotor 6 is rotated in the counterclock direction.

An arm 8 extends radially from the periphery of the rotor 6 and a pin 9 secured to the free end of the arm 8 slidably engages with an elongated hole 10 formed in the shutter blade 1. Thus, when the rotor 6 is rotated in the clockwise direction, the shutter blade 1 is moved to the opened position clearing the aperture 2, while, when the rotor 6 is rotated in the counterclock direction, the aperture 2 is closed by the movement of the shutter blade 1 in the clockwise direction, thereby permitting the aperture 2 to be opened and closed.

In order to energize the actuator 4, an electric source 11 and a driver 12 connected to the electric source 11 and the stationary coil 7 are provided so as to apply to the coil 7 a current in one direction or in the opposite direction to move the shutter blade 1 to the open position or to the closed position and maintain the shutter blade 1 thereat insofar as the current continues to be applied to the coil 7, thereby permitting a required exposure time to be achieved by appropriately controlling the application of the current in one or the other direction.

In accordance with the characteristic feature of the present invention, the electric source 11 is constructed as a constant current circuit and a current regulating circuit 13 is interposed between the constant current circuit 11 and the driver 12 so as to regulate the current to be applied to the coil 7.

Since the opening speed of the shutter blade 1 is varied mainly depending upon the resistance of the stationary coil 7 and the magnetic intensity of the permanent magnet rotor 6, the opening speed of the shutter blade 1 can be set to the desired speed by adjusting the current supplied to the stationary coil 7.

Therefore, a complicated circuit and an encoder and the like required in the prior art shutter for adjusting the opening speed of the shutter blade 1 are no longer required in the shutter of the present invention, thereby permitting the construction to be substantially simple, while direct drive of the actuator 4 is made possible.

In FIG. 1, only a single shutter blade 1 is shown. However, two or more shutter blades may be provided for opening and closing the aperture 2 insofar as they are commonly coupled with the actuator 4 so as to be commonly opened and closed thereby.

Figure 2:
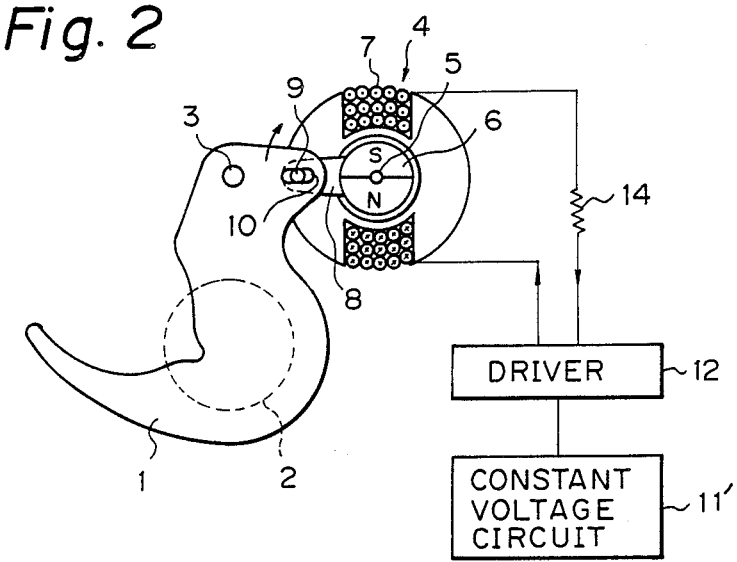
FIG. 2 is a schematic diagram similar to FIG. 1 but showing a variation of the device shown in FIG. 1.

FIG. 2 shows a variation of FIG. 1.

The embodiment of FIG. 2 is substantially similar to that of FIG. 1 except that the electric source is substituted by a constant voltage circuit 11' and the current regulating circuit 13 is replaced by a resistor 14 connected between the driver 12 and the stationary coil 7.

Thus, in the embodiment of FIG. 2, the voltage applied to the stationary coil 7 is adjusted correspondingly to the magnetic intensity of the permanent magnet rotor 6 by appropriately regulating the resistance of the resistor 14 thereby permitting the rotational speed of the rotor 6 to be varied so as to set the opening speed of the shutter blade 1 to the desired speed.

As in the case of the embodiment of FIG. 1, a pair of shutter blades may by provided in the embodiment of FIG. 2.

The resistor 14 may be replaced by a volum element.

Further, connecting lever means may be connected between the arm 8 and the shutter blade 1 in either of the embodiment of FIG. 1 or FIG. 2.

Figure 3:
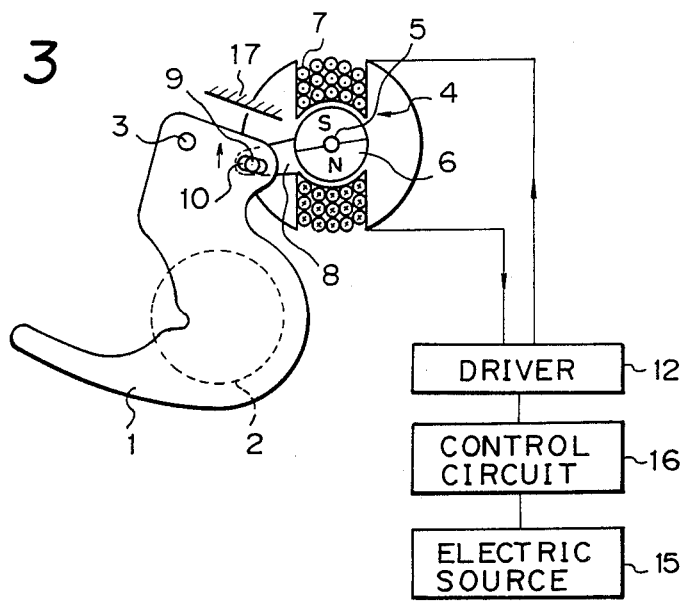
FIG. 3 is a schematic diagram similar to FIG. 1 but showing a second embodiment of the device of the present invention.

FIG. 3 shows a second embodiment of the present invention particularly adapted to effectively prevent the bounce of the shutter blade at the fully opened position.

The embodiment of FIG. 3 is substantially similar in construction to that of FIG. 1 except that the driver 12 is connected to the electric source 15 through a control circuit 16 so that the timing of the supply of the current to the stationary coil 7 is controlled by the control circuit 16.

Further, a stopper 17 is provided so as to arrest the shutter blade 1 at the fully opened position.

In accordance with the characteristic feature of the present invention, the control circuit 16 is so constructed that the opening current $i_1$ (FIG. 4) applied to the stationary coil 7 from the trigger point t0 through the driver 12 for opening the shutter blade 1 is terminated at a predetermined time point t1 prior to the time point t2 at which the shutter blade 1 reaches the fully opened position to abut against the stopper 17, and then the closing current $i_2$ is applied to the coil 7 until the time point t2, and then an opening current $i_3$ of the lower value than the opening current $i_1$ for maintaining the shutter blade 1 in the fully opened position is again applied until the time point t3 at which the shutter blade 1 is to be closed for terminating the exposure, and the closing current $i_2$ is finally applied to the coil 7 for closing the shutter blade 1.

Figure 4:
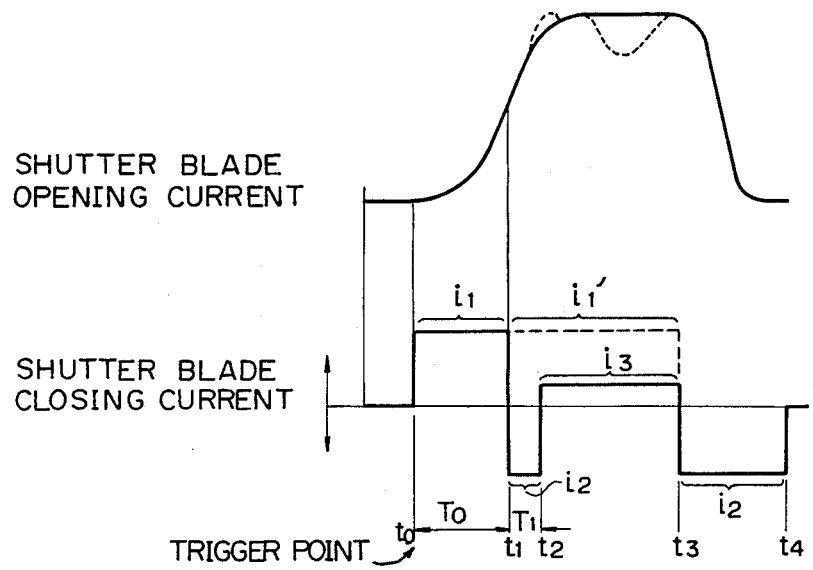
FIG. 4 is a diagram showing the relationship between the shutter blade opening curve and the shutter blade opening current and the shutter blade closing current obtainable by the device shown in FIG. 3.

FIG. 4 shows the relationship between the shutter blade opening curve and the course of applying the opening and the closing current to the coil 7.

Thus, the shutter blade 1 commences to be opened at the gradually increasing speed from the time point t0 to the time point t1 (the duration being T0), and the opening speed is lowered from the time point t1 to the time point t2 (the duration being T1) at which the shutter blade 1 abuts against the stopper 17. Therefore, the impact of the shutter blade 1 against the stopper 17 is greatly reduced so that the bounce of the shutter blade 1 is avoided and the shutter blade 1 is held at the fully opened position and it is positively held thereat by virtue of the application of the opening current $i_3$ of the lower value until the closing current $i_2$ is applied at the time point t3 for terminating the expsoure. Thus, the shutter blade opening curve is made a stable and flat curve.

To the contrary, in the case of the prior at shutter in which the opening current $i_1'$ continues to be applied from the time point t0 until the time point t3 as shown by the broken line in FIG. 4, the shutter blade 1 would be subject serious bounce by the abutment against the stopper 17 as shown by the broken line in the curve in FIG. 4 thereby detercorating the performance of the shutter.

Figure 5:
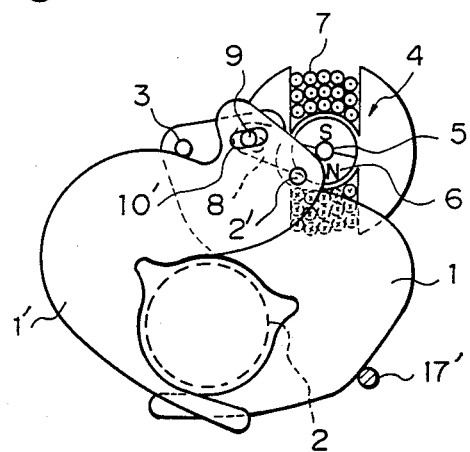
FIG. 5 is a schematic diagram showing a third embodiment of the device of the present invention.

FIG. 5 shows a third embodiment of the present invention in which a pair of symmetrically configured and symmetrically actuatable shutter blades for preventing the bounce and improving the movement of the shutter blades.

The embodiment of FIG. 5 is substantially similar to that of FIG. 3 except that a further shutter blade 1' having the shape substantially symmetrical to that of the shutter blade 1 and pivotally supported by a pivot shaft 2' with the elongated hole 10' formed therein slidably receiving the pin 9 of the arm 8 of the actuator 4, the electric circuit for energizing the coil 7 being similar to that of FIG. 3 and, therefore, the illustration omitted. In this embodiment, a stopper 17' is provided so as to stop one of the pair of shutter blades 1, 1' at the fully opened position, while the other shutter blade is left free to move beyond the fully opened position by the inertia of the opening movement of the shutter blade 1'.

Figure 6:
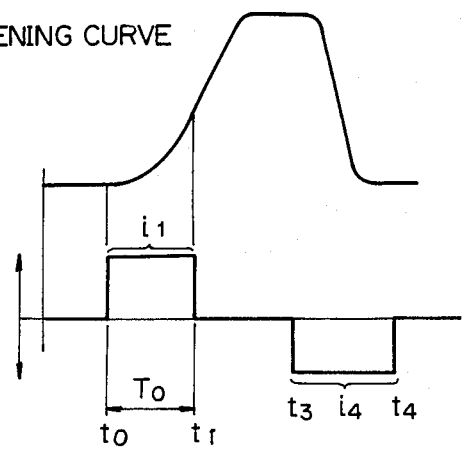
FIG. 6 is a diagram showing the relationship between the shutter blades opening curve and the shutter blades opening current and the shutter blades closing current obtainable by the device shown in FIG. 5.

FIG. 6 shows the course of application of the opening current i1 and the closing current i4.

The opening current i1 is applied to the coil 7 during the duration T0 from the time point t0 to the time point t1 a predetermined time period prior to the time point at which the shutter blades 1, 1' are brought to the fully opened positions. The opening speed of the shutter blades 1, 1' is gradually reduced from the time point t1 at which the opening current i1 is interrupted by virtue of the friction of the shutter blades 1, 1' and the associated members.

When the shutter blade 1 abuts against the fully opened position, it tends to bounce back, while the other blade 1' tends to further move beyond the fully opened position by the inertia of the opening movement of the shutter blade 1'.

Since the pair of shutter blades 1, 1' are commonly coupled with the pin 9 of the actuator 4, the bounce of the shutter blade 1 is cancelled by the inertia of the opening movement of the shutter blade 1' having substantially the same mass as that of the shutter blade 1 and both the shutter blades 1, 1' are stationarily held stably at the fully opened positions.

When the exposure is to be terminated, the closing current i4 is applied at the time point t3 and intercepted at the time point t4 to close the shutter blades 1, 1'.

It is clear that a low opening current such as the current i3 in FIG. 4 may be applied also in the embodiment of FIG. 5 as in the case of the embodiment of FIG. 3.

Figure 7:
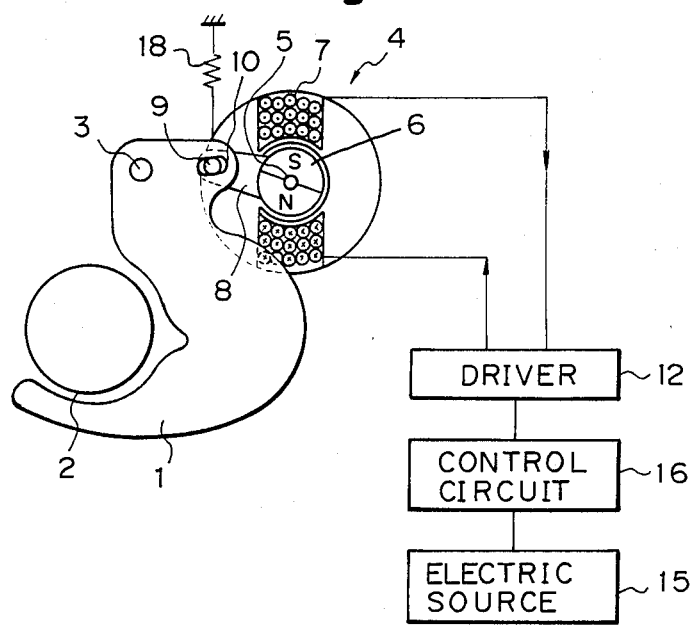
FIG. 7 is a schematic diagram showing the fourth bodiment of the device of the present invention.

FIG. 7 shows a fourth embodiment of the present invention adapted particularly for use in a single lens reflex camera of the lens shutter type in order to improve the movement of the shutter blade.

In a single lens reflex camera of the lens shutter type, the shutter must be kept opened at all times prior to the exposure for enabling the operator to view the scene to be photographed through the opened shutter while the photosensitive material is prevented from being exposed to the scene light by a light intercepting plate or a reflecting mirror and, after the focusing is completed, the shutter is once closed upon actuation of release means of the camera and then the shutter blade is opened and closed for effecting the required exposure.

Therefore, the shutter blade must be biased by spring means or the like so as to be kept opened stably at all times.

Thus, the closing speed of the shutter blade tends to be slowed down in comparison with the opening speed by virtue of the provisions of biasing means for urging the shutter blade to the opened position, thereby making it impossible to obtain a shorter exposure time.

The embodiment of FIG. 7 for improving the movement of the shutter blade to achieve a shorter exposure time is substantially similar in construction to that shown in FIG. 3 except that a spring 18 is provided and one end thereof is connected to the shutter blade 1 while the other end is secured to a stationary point in the shutter so as to urge at all times the shutter blade 1 toward the fully opened position at which it is stopped by a stopper (not shown).

In accordance with the characteristic feature of the present invention, the closing current i2' to be supplied to the stationary coil 7 from the control circuit 16 through the driver 12 is made greater than the opening current i1 to the maximum limit of the rating of the control circuit 16.

Figure 8:
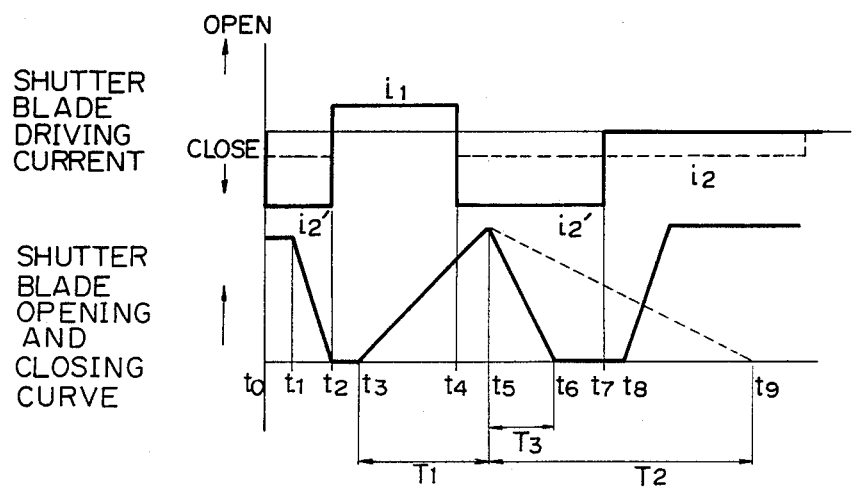
FIG. 8 is a diagram showing the relationship between the shutter blade driving current and the shutter blade opening and closing curve obtainable by the device shown in FIG. 7.

FIG. 8 shows the relationship between the course of application of the opening current i1 and the closing current i2' and the opening and closing curve of the shutter blade 1 obtained by the application of the opening and closing currents i1, i2' to the stationary coil 7.

Starting from the time point t0 at which the release means of the camera is actuated by the operator, the closing current i2' is first applied to the coil 7 and the shutter blade 1 which has been opened for the focusing purpose begins to be closed at the time point t1 after the mechanical delay time of the shutter and fully closed at the time point t2 at which the opening current i1 is applied to the coil 7 for the exposure of the camera so that the shutter blade 1 begins to be opened at the time point t3 after the mechanical delay time of the shutter with the aid of the action of the spring 18.

The opening current i1 is intecepted at the time point t4 and the closing current i2' is applied to the coil 7 a predetermined time period before the shutter blade comes to the fully opened position for avoiding the severe impact of the shutter blade 1 against the stopper means at the fully opened position, and the shutter blade 1 reaches the fully opened position at the time point t5 by the inertia of the movement of the shutter blade 1 and the shutter blade 1 begins to be closed at the time point t5 and is fully closed at the time point t6.

The closing current i2' is intercepted at the time point t7 after the completion of the exposure and the shutter blade 1 begins to be again opened by the action of the sprint 18 at the time point t8 after the mechanical delay time so as to be ready for the focusing purpose for the next exposure.

As is clear from FIG. 8, the time period T3 from the time point t5 to the time point t6 in which the shutter blade 1 is closed from the fully opened position is remarkably reduced in comparison with the time period T2 from the time point t5 to the time point t9 in which the shutter blade 1 is closed by the closing current i2 the value of which is not increased in accordance with the present invention.

As seen from FIG. 8, the time period T1 in which the shutter blade 1 is opened is shorter than the time period T2 due to the fact that the action of the spring 18 aids in opening the shutter blade 1, whereas the action of the spring 18 resists against the closing movement of the shutter blade 1.

Therefore, the performance of the shutter blade 1 is improved and a substantially shorter exposure time can be obtained in accordance with the present invention.

Figure 9:
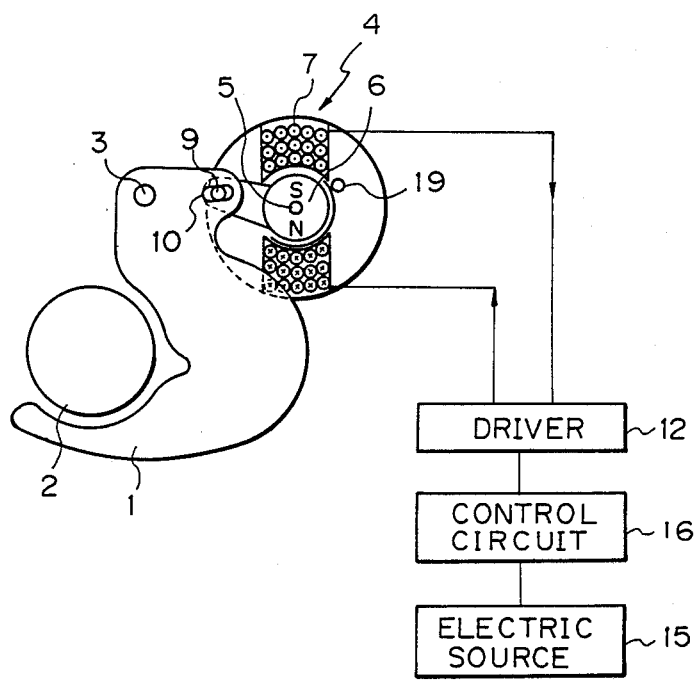
FIG. 9 is a schematic diagram showing a modified embodiment of FIG. 7.

FIG. 9 shows a modified form of FIG. 7. The embodiment of FIG. 9 is substantially similar to that of FIG. 7 except that the spring 18 is replaced by a magnetic body such as an iron pin 19 provided adjacent to the rotary magnet rotor 6 at a position near the S-pole in the case of FIG. 9 so that the magnetic interaction between the iron pin 19 and the S-pole urges the rotor 6 in the clockwise direction thereby urging the shutter blade 1 toward the fully opened position so as to maintain stably thereat.

The operation and the effectiveness of the embodiment of FIG. 19 is similar to those of FIG. 7.

What is claimed is:

1. In a device for opening and closing shutter blade(s) of a shutter in a photographic camera having an electromagnetic actuator of a rotary magnetic type including a rotatable permanent magnet rotor operatively coupled with said shutter blade(s) and a stationary coil surrounding said rotor and electromagnetically cooperating therewith, said rotor being adapted to be rotated in one direction when a current is applied in one direction to said stationary coil from an electrical source through a driver, while said rotor is rotated in an opposite direction when a current is applied to said stationary coil in an opposite direction, thereby permitting said shutter blade(s) to be opened and closed depending upon a direction of the current applied to said stationary coil for achieving an exposure of said camera, wherein:

said electric source is a constant current circuit;
a current regulating circuit is interposed between said constant current source and said driver; and
the current to be applied to said stationary coil is adjusted to the magnetic intensity of said permanent magnet by regulating said current regulating circuit so that a required opening speed of said shutter blade(s) is adjustable obtained.

2. In a device for opening and closing shutter blade(s) of a shutter in a photographic camera having an electromagnetic actuator of a rotary magnetic type including a rotatable permanent magnetic rotor operatively coupled with said shutter blade(s) and a stationary coil surrounding said rotor and electromagnetically cooperating therewith, said rotor being adapted to be rotated in one direction when a current is applied in one direction to said stationary coil from an electrical source through a driver, while said rotor is rotated in an opposite direction when a current is applied to said stationary coil in an opposite direction, thereby permitting said shutter blade(s) to be opened and closed depending upon a direction of the current applied to said stationary coil for achieving an exposure of said camera, wherein:

said electric source is a constant voltage circuit;
a resister is connected in series between said driver and said stationary coil; and
the voltage to be applied to said stationary coil is adjusted corresponding to the magnetic intensity of said permanent magnet by regulating the resistance of said resister so that a required opening speed of said shutter blade(s) is adjustably obtained.

3. In a device for opening and closing shutter blade(s) of a shutter in a photographic camera having an electromagnetic actuator of a rotary magnetic type including a rotatable permanent magnet rotor operatively coupled with said shutter blade(s) and a stationary coil surrounding said rotor and electromagnetically cooperating therewith, said rotor being adapted to be rotated in one direction when a current is applied in one direction to said stationary coil from an electrical source through a driver, while said rotor is rotated in an opposite direction when a current is applied to said stationary coil in an opposite direction, thereby permitting said shutter blade(s) to be opened and closed depending upon the direction of the current applied to said stationary coil for achieving the exposure of said camera, wherein:

stop means are provided for abutting against at least one of said shutter blade(s) at a fully opened position thereof;
said control circuit supplies a shutter opening current to said stationary coil during a time point from a trigger point at which the opening of said shutter blade(s) is to be commenced until a time point a predetermined time period prior to the fully opened position of said shutter blade(s) abutting against said stop means and,
thereafter, said control circuit supplies a shutter closing current to said stationary coil for a predetermined time period for braking the opening movement of said shutter blade(s) so that an impact of said shutter blade(s) against said stopper means at the fully opened position of said shutter blades(s) is reduced to avoid a bounce thereof.

4. Device as set forth in claim 3, wherein said control circuit supplies to said stationary coil a current of a value less than that of said shutter opening current after interruption of said shutter closing current so as to maintain said shutter blade(s) in the fully opened position.

5. In a device for opening and closing a pair of symmetrically configured, commonly coupled, and symmetrically actuatable shutter blades of a shutter in a photographic camera having an electromagnetic actuator of a rotary magnetic type including a rotatable permanent magnet rotor operatively coupled with each of said shutter blades and a stationary coil surrounding said rotor and electromagnetically cooperating therewith, said rotor being adapted to be rotated in one direction when a current is applied in one direction to said stationary coil from an electrical source through a driver, while said rotor is rotated in an opposite direction when a current is applied to said stationary coil in an opposite direction, thereby permitting said shutter blades to be opened and closed depending upon the direction of the current applied to said stationary coil for achieving the exposure of said camera, the improvement comprising:

stopper means for abutting against one of said pair of shutter blades at a fully opened position thereof for stopping the same thereat,
wherein said control circuit supplies a shutter opening current to said stationary coil during a time period from a trigger point at which an opening of said shutter blades from the closed position is to be commenced until a time point a predetermined time prior to a fully opened position of said one of said pair of shutter blades adapted to abut against said stopper means and interrupts supply of the shutter opening current thereat, thereby permitting a bouncing movement of said one of said pair of shutter blades from said stopper means upon abutment thereagainst at its fully opened position to be canceled by the inertia of the opening movement of the other of said pair of shutter blades so that bounce of said shutter blades is avoided.

6. Device as set forth in claim 5, wherein said control circuit supplies to said stationary coil a current in said one direction of a value less than that of said shutter opening current after a predetermined time period after interruption of said shutter opening current so as to maintain said shutter blades in the fully opened position.

7. In a device for opening and closing shutter blade(s) of a shutter in a photographic camera, particularly of the type of a single lens reflex camera having a lens shutter, having means for biasing said shutter blade(s) toward an opened position for stably maintaining the shutter blades thereat and an electromagnetic actuator of a rotary magnetic type including a rotatable permanent magnet rotor operatively coupled with said shutter blade(s) and a stationary coil surrounding said rotor and electromagnetically cooperating therewith, said rotor being adapted to be rotated in one direction when a current is applied in one direction to said stationary coil from and electrical source through a driver, while said rotor is rotated in an opposite direction when a current is applied to said stationary coil in an opposite direction, thereby permitting said shutter blade(s) to be opened and closed depending upon the direction of the current applied to said stationary coil for achieving the exposure of said camera, wherein:

said control circuit supplies a current for closing said shutter blade(s) to said stationary coil having a magnitude which is greater than that of a current for opening said shutter blade(s), thereby permitting said shutter blade(s) to be closed at a higher speed against the action of said means for biasing said shutter blade(s) toward the opened position so that a shorter exposure time is achieved.

* * * * *